United States Patent Office 3,712,823
Patented Jan. 23, 1973

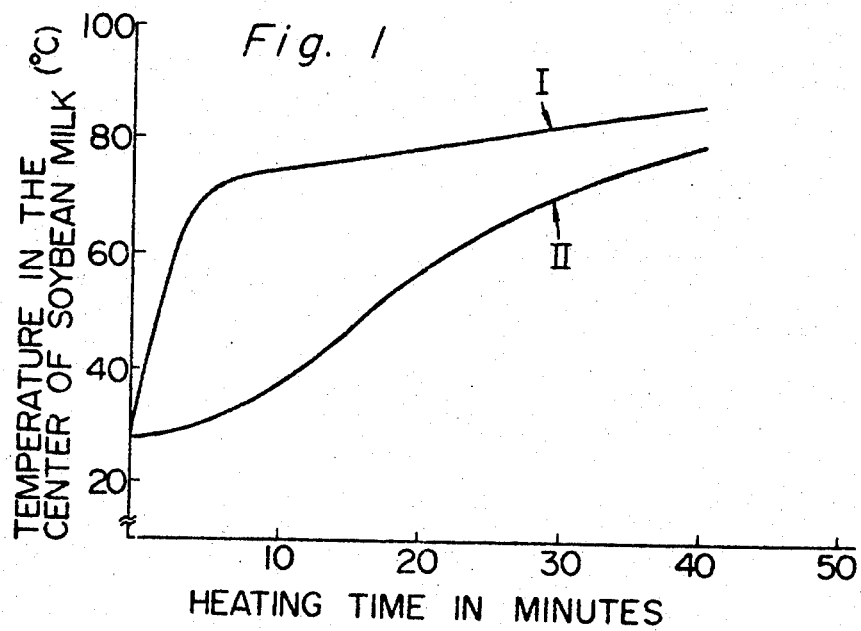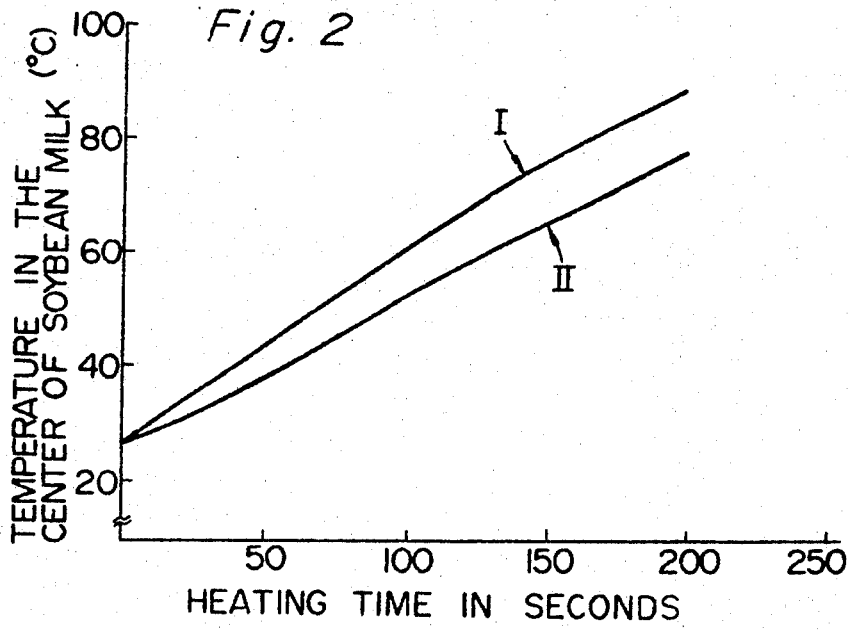

3,712,823
PROCESS FOR PRODUCING STERILIZED PACKED
SOYBEAN-CURDS
Ryuzo Ueno, Nishinomiya, Japan, assignor to Kabushiki
Kaisha Ueno Seiyaku Oyo Kenkyujo, Osaka, Japan
Filed Aug. 17, 1970, Ser. No. 64,350
Claims priority, application Japan, Aug. 21, 1969,
44/65,679
Int. Cl. A23l 1/20, 3/02
U.S. Cl. 99—214        5 Claims

ABSTRACT OF THE DISCLOSURE

In a process for producing packaged soybean-curds by immersing soybean in water, grinding, heating and filtering it, cooling the resulting soybean milk, putting it in a container, adding a coagulating agent, immediately sealing the packing container, and heating it to effect the coagulation and sterilization of the soybean milk, the improvement which comprises subjecting the soybean milk packaged in the container to high frequency electrical wave irradiation for a period of 50–200 seconds until the temperature rises to 55–80° C., and thereafter allowing it to stand for 10 minutes to 2 hours at a temperature above 30° C. to coagulate it:

---

This invention relates to a process for producing packed or packaged soybean-curds known as "tofu."

Soybeans are important foodstuffs in the Oriental area of the world, and various foodstuffs of soybean origin are served in daily meals. The present invention contemplates the production of soybean-curds most commonly eaten among the various soybean foods, which have good preservability and high quality.

The production of soybean-curds involves immersing soybean in water for 8 to 20 hours, grinding it, adding 4–10 times its weight of water, heating the mixture to 80–90° C., filtering it, adding a coagulating agent to the filtrate at 70–80° C. known as soybean milk and allowing it to stand while heating, to thereby coagulate it. The soybean milk is an aqueous extract of protein. As the coagulating agent, calcium chloride, magnesium chloride and calcium sulfate are used, and in recent years, gluconodeltaactone has also been put to use. The soybean-curds so produced lend themselves to inconvenient handling, because they are a soft gel. There is also a disadvantage that the soybean-curds are putrefied within 24 hours at room temperature. In an attempt to overcome these disadvantages, packaged soybean-curds have been produced in recent years.

In general, the packaged soybean-curds are produced by packing cold soybean milk containing a coagulating agent into a container made of a synthetic resin, and heating the package in hot water maintained at 80–90° C. to thereby effect its coagulation and sterilization. Mere addition of a coagulating agent to cooled soybean milk hardly causes coagulation, and it is necessary to heat it. In this process, the coagulating and sterilizing steps are of utmost significance. The coagulating temperature of "tofu" is about 60–70° C., although lower temperatures are applicable. On the other hand, the higher the sterilizing temperature, the more marked the sterilizing effect and the shorter the sterilizing time. Since the quality of "tofu" is deteriorated when it is exposed to high temperatures for a long time, lower sterilizing temperatures and shorter sterilization times are preferred. The deterioration of soybean-curds shows itself mainly in the releasing of water therefrom (this phenomenon will be referred to herein as "water release") and roughening which is meant to indicate that the smooth surface and the inside of the soybean-curds become roughened and non-uniform. These deteriorating phenomena are detrimental to the taste, and in addition, consumers do not like water-released soybean-curds even when they are not putrefied. Accordingly, the water release remarkably reduces the commercial value.

The coagulating and sterilizing steps are usually carried out in hot water at 80–90° C. for 30–40 minutes. Since temperatures above 90° C. are not desirable for deterioration reasons, sterilization is sometimes not sufficient under these temperature and time conditions. Quality deterioration could be caused even when heating at 90° C. for 40 minutes.

When soybean milk filled in a container is heated by immersion in hot water to effect its coagulation and sterilization, the soybean milk in the container is heated first at the outside portion and progressively into the interior. Therefore, the coagulation of soybean milk begins at the outside portion, and gradually proceeds to its interior. The movement of heat from the outside portion to the inside portion of the soybean milk is caused by convection when the soybean milk has not yet been coagulated. When the temperature of the outside portion rises and the soybean milk coagulated, the movement of heat depends only on heat transmission. Therefore, when the convection is ceased, the heat transmission becomes exceedingly worse, and a temperature rise in the interior of the soybean milk becomes slow. For this reason, sufficient heat sterilization of soybean-curds requires long periods of immersion in water maintained at high temperatures. Thorough heat sterilization, however, causes deterioration in quality of the packaged soybean-curds, as previously stated.

It is also known to effect intermittent heat sterilization of "tofu" at temperatures such as not to cause water release or roughening. But this requires a complicated procedure.

Accordingly, there has been a demand for a method of coagulating and sterilizing packaged soybean-curds by which substantially thorough heat sterilization is effected without causing any deterioration in quality.

It has now been been found that by heating packaged soybean-curds with high frequency irradiation, the packaged soybean-curds can be heated to a high temperature within a short period of time even to the inside thereof, and a marked sterilizing effect can be achieved without substantially coagulating soybean milk. It has also been found that when soybean milk is subjected to high frequency irradiation and then allowed to stand at a temperature above 30° C. to coagulate it, soybean-curds substantially free of water release and roughening can be obtained.

In the case of high frequency heating, soybean milk immediately after heating is not at all coagulated, or only slightly coagulated such that it is nearly liquid. The reason for this is probably due to the different heating mechanism between high frequency heating and hot water heating. In the high frequency heating, soybean milk irradiated with high frequency absorbs its electric wave energy, and the absorbed energy is converted to heat. It is assumed that because the high frequency heating is too abrupt, the coagulation of the soybean milk cannot occur with the rate of temperature rise of the soybean milk. When after having been heated and sterilized by the high frequency irradiation, the soybean milk is allowed to stand at a temperature not lower than 30° C., it is completely coagulated, and soybean-curds of good quality with no water release and with fine texture can be obtained.

By the packaged soybean-curds or tofu, used in the present specification, is meant soybean-curds enclosed in a water-proof container of optional shapes made of polyethylene, polypropylene, polystyrene, polyvinyl chloride, polycarbonate and other synthetic resins.

In the process of the present invention, high frequency in the frequency range of 500 to 10,000 mc./sec. can be used. When the frequency is below 500 mc./sec., the efficiency of absorption of the electrical wave energy by foodstuffs is reduced. With frequencies above 10,000 mc./sec., it is difficult to produce tubes capable of generating electrical wave energy of large capacity with stability and good efficiency, and therefore, these wavelengths are not commercially feasible.

Within the range of 500 to 10,000 mc./sec. preferable for heating and sterilizing foodstuffs, high frequencies allowed internationally for the heating and sterilization of foodstuffs, namely $915 \pm 25$ mc./sec., and $2,450 \pm 50$ mc./sec. The use of high frequencies of wavelengths $2,450 \pm 50$ mc./sec. is especially preferred in the invention because of the absorbing efficiency of the electric wave energy on foodstuffs.

The output of high frequency that can be used in the invention is 5–100 kw. in a commercial-scale high frequency irradiating apparatus.

The time required for high frequency irradiation of soybean milk varies depending upon the amount of high frequency to be absorbed by the soybean milk. If the amount of energy is large, shorter periods of irradiation will suffice. In the general practice, soybean milk containing a coagulating agent and packed in a container made of polyethylene is subjected to high frequency irradiation for 50 to 200 seconds, preferably 60–150 seconds to raise the temperature in the center of the soybean milk to 55–85° C., preferably 60–80° C. Alternatively, the carry-over heating method may be employed in which soybean milk is subjected to high frequency irradiation for 50–100 seconds, preferably 50–70 seconds, then the irradiation is stopped for 1 to 5 minutes, preferably 3 to 5 minutes, and the milk is again subjected to the irradiation for 50–100 seconds, preferably 50–70 seconds. When high frequency irradiation is effected continuously for a long time, an object near the source of high frequency, for instance, a very minor area of the surface of soybean milk is boiled, and the temperature becomes progressively lower towards the center of the soybean milk. When the irradiation is stopped for 1 to 5 minutes, preferably 3 to 5 minutes after the initial irradiation, heat is transmitted to the lower temperature portion, and the temperature becomes uniform throughout the soybean milk. This is called "carry-over heating." If this stopping time is less than one minute, the carry-over heating effect is not obtained. But if the stopping lasts for more than 5 minutes, undesirable effects are caused on the dissipation of heat and the economy of processing.

The packaged soybean milk subjected to the high frequency irradiation is substantially liquid, but is fully sterilized. Such soybean milk is thereafter coagulated at a temperature not lower than 30° C., preferably 40 to 80° C. for a period of 10 minutes to 2 hours, preferably 20 to 40 minutes.

The coagulation time and temperature have to do with the temperature in the center of the soybean milk after the high frequency irradiation. When the temperature in the center of the soybean milk is high, lower coagulation temperatures and shorter coagulation times will suffice for obtaining fully coagulated soybean-curds.

If the high frequency irradiation step and the coagulation step are effected in the reverse sequence, soybean-curds of good quality cannot be obtained. When soybean milk is first coagulated, and then irradiated with high frequency, convection of heat no longer takes place at the coagulated part, and a very minor part near the source of irradiation is over-heated to cause water release and roughening.

In the conventional sterilization of packaged soybean-curds, heating is done at a temperature in the range of 80 to 90° C. for a period of 30 to 40 minutes. Such sterilization method cannot completely destroy bacteria. The number of bacteria present in the packaged soybean-curds is approximately $2 \times 10$ to $25 \times 10^2$ gram. The preservability of the packaged soybean-curds is naturally dependent on the number of bacteria. Generally, the packaged soybean-curds are preservative for 5 to 15 days or so at 30° C.

The packaged soybean-curds produced in accordance with the process of the present invention contain bacteria amounting to the order of 10/gram at most, and are preserved for about 15 to 30 days when kept at 30° C.

The coagulating agents used in the present invention are those generally used such as gluconodeltalactone, calcium sulfate, calcium chloride and magnesium chloride, and any other substances suitable for coagulation of soybean milk.

Experimental Example 1

Four containers made of high density polyethylene and having a size 47 mm. in length, 80 mm. in width and 80 mm. in height were each packed with 300 ml. of soybean milk at 25° C. containing 0.3% gluconodeltalactone as a coagulating agent or 0.4% of calcium sulfate, and immersed in hot water at 90° C. or heated by high frequency irradiation. The temperature in the center of the soybean milk was measured at certain time intervals. As the high frequency irradiation apparatus, electronic range NE–500 (high frequency output 500 w., frequency $2450 \pm 50$ mc./sec.; product of Matsushita Electric Appliances Industry, Co., Ltd., Japan) was used. The results obtained are shown in FIGS. 1 and 2. FIG. 1 is a graphic representation showing the relation between the heating time and the temperature in the center of the soybean milk when the heating is done by immersion in hot water (comparative example), and FIG. 2 is a graphic representation showing the same relation when the heating is done by high frequency irradiation (present invention). In each of these graphs, the temperature in the center of the soybean milk expressed in degrees centigrade is plotted on the axis of ordinates, and the heating time either in minutes (FIG. 1) or in seconds (FIG. 2), on the axis of abscissa. Curve I represents the instance of using gluconodeltalactone as the coagulating agent, and Curve II, the instance of using calcium sulfate.

In FIG. 1, the temperature rise curve differs remarkably between the case of using gluconodeltalactone and the case of using calcium sulfate. This is due to the deviation of time at which the effect of coagulating action appears. When gluconodeltalactone is used as the coagulating agent, the coagulating action appears following the rise in the temperature of the soybean milk. Accordingly, during this time lag, convection of heat occurs to raise the temperature in the center of soybean milk rapidly. In 5 minutes after the initiation of heating, coagulation begins, and thereafter, heat is moved by heat transmission. Thus the temperature in the center rises gradually. When calcium sulfate is used as the coagulating agent, the coagulating action occurs at the same time as the temperature rise, and the movement of heat is mainly by means of heat transmission. The temperature in the center rises very slowly.

In FIG. 2, the curves resemble each other both in the case of gluconodeltalactone and calcium sulfate. In the case of calcium sulfate, the temperature rise tends to be rather smaller. In the case of heating by immersion in hot water, the time required to raise the temperature of the central part of soybean milk to 75° C. is 17 minutes (1020 seconds) for the soybean milk containing gluconodeltalactone, and 36 minutes (2160 seconds) for the soybean milk containing calcium sulfate. In contrast, in the case of high frequency heating, the time is 145 seconds for the soybean milk containing gluconodeltalactone and 190 seconds for the soybean milk containing calcium sulfate.

Accordingly, in the heating by means of immersion in hot water, a coagulated product of soybean milk at the outside portion in contact with hot water is exposed to high temperatures for a time 7 to 11 times as long as that in the high frequency heating, and is liable to undergo water release or roughening to extreme degrees. As regards the sterilizing effect, too, the high frequency heating is superior to the heating by immersion in hot water.

Experimental Example 2

The containers used in Experimental Example 1 were packed with soybean milk containing a coagulating agent in the same manner as set forth in Experimental Example 1, and were subjected to high frequency irradiation for 100 seconds using the same high frequency irradiating apparatus as used in Experimental Example 1. Thereafter, they were allowed to stand for 5 minutes with the stoppage of the high frequency heating, and then again subjected to the high frequency irradiation for 50 seconds. The soybean-curds so obtained were allowed to stand under the conditions indicated in Table 1, and the coagulated condition and quality of the products were examined.

In Runs Nos. 3 and 4 carried out for comparative purposes, soybean-curds were produced by the conventional method in which soybetns milk packed in a container was immersed for 30 minutes in hot water maintained at 90° C.

conventional method of heating in hot water undergo water release and roughening.

Experimental Example 3

Three hundred milliliters of soybean milk at 25° C. containing 0.3% of gluconodeltalactone as a coagulating agent were packed into each of high density polyethylene containers of the same size as set forth in Experimental Example 1.

Each of the soybean milk-containing containers was subjected to high frequency irradiation, and the soybean milk was coagulated under the conditions shown in Table 2. The quality and preservability of the soybean-curds so produced were examined. The results are also shown in Table 2.

In this experiment, the high frequency irradiation apparatus usd was DR-121 (product of Hitachi Seisakusho, Japan; frequency 2400–2500 mc., the output 1.2 kw). The irradiating conditions shown in Table 2 were attained by varying the plate current of the magnetron which is the high frequency generator of this apparatus. The putrefaction of the soybean-curds was determined by the evolu-

TABLE 1

| Run No. | Coagulating agent | Temperature of the central part, ° C. | Heating time and temperature | Coagulated condition | Quality of soybean-curds | |
|---|---|---|---|---|---|---|
| | | | | | Water release | Roughening |
| 1 | Gluconodeltalactone | 76.0 | 2 hours, 20° C | Exceedingly soft | Not observed | Not observed. |
| | | 75.5 | 2 hourrs, 30° C | Good | do | Do. |
| | | 75.0 | 2 hours, 50° C | do | do | Do. |
| | | 75.5 | 40 minutes, 60° C | do | do | Do. |
| 2 | Calcium sulfate | 66.0 | 2 hours, 20° C | Somewhat soft | do | Do. |
| | | 65.0 | 2 hours, 30° C | Good | do | Do. |
| | | 66.0 | 2 hours, 50° C | do | do | Do. |
| | | 66.0 | 40 minutes, 60° C | do | do | Do. |
| 3 | Gluconodeltalactone | 81.0 | | do | Clearly observed | Clearly observed. |
| 4 | Calcium sulfate | 68.0 | | do | do | Do. |

It is seen from the results shown in this table that the temperature for coagulating soybean milk containing a tion of gas, release of water, surface roughening, and also the smell upon opening the container.

TABLE 2

| | High frequency irradiation time and the temperature in the center of soybean milk | | Heating and coagulating step | | | Preservability | |
|---|---|---|---|---|---|---|---|
| Run Number | Seconds | ° C. | Time, min. | Temp., ° C. | Appearance | Temperature, ° C. | Days |
| 5 | 55 | 50 | 20 | 70 | No water release nor roughening; good | 30 | 7 |
| 6 | 200 | 90 | 20 | 70 | Water release and roughening observed | 30 | 30 |
| 7 | 45 | 55 | 20 | 70 | Because or very abrupt heating, the temperature rise is not uniform; a part of the soybean milk boiled and water release and roughening observed; sometimes the container ruptured. | 30 | 20 |
| 8 | 220 | 85 | 20 | 70 | Slight water release observed; in the latter half of irradiation, a part of the soybean milk is in a coagulated condition. | 30 | 28 |
| 9 | 150 | 75 | 20 | 70 | Good | 30 | 27 |
| 10 | 150 | 75 | 20 | 70 | No water release nor roughening | 30 | 25 |
| 11 | 200 | 85 | 30 | 60 | do | 30 | 30 |
| 12 | 100 | 70 | 70 | 85 | Water release and roughening observed because of long time exposure to high temperature. | 30 | 30 |
| 13 | 100 | 70 | 5 | 35 | Sufficient coagulation unobtainable | | |
| 14 | 100 | 70 | 5 | 85 | do | | |
| 15 | 220 | 85 | 30 | 60 | Slight water release; roughening observed | 30 | 30 |
| 16 (control) | 90 | 40 | | | Water release and roughening observed | 30 | 15 |
| 17 (control) | 85 | 35 | | | No water release nor roughening | 30 | 10 | coagulating agent should be at least 30° C., and at temperatures below this the coagulation of soybean milk is insufficient, and the resulting curds are too soft. Although not shown in this table, the results obtained when the soybean milk is left to stand for 4 hours at 20° C. are identical with those obtained when it is left to stand for 2 hours at this temperature. This indicates that at 20° C., there is no appreciable effect obtained by allowing the soybean milk to stand for a longer time.

The products obtained by the process of the present invention suffer substantially no water release and roughening irrespective of the heating temperature, and exhibit good quality. In contrast, the products obtained by the

Experimental Example 4

A polystyrene container having a thickness of 0.2 mm. and a size of 115 mm. x 85 mm. x 30 mm. was packed with 280 g. of soybean milk or soybean-curds, and subjected to high frequency irradiation using electronic range NE-500 (the high frequency output 500 w., the frequency 2,450 mHz.). The temperatures in the center of the soybean milk and soybean-curds were measured.

The high frequency irradiation was carried out for 30 seconds each time. After the end of 30-second irradiation, the temperature of the central part of the material is measured, and immediately after completion of the measurement, the material is subjected to the next high frequency irradiation for 30 seconds. The results obtained are shown in Table 3 below.

TABLE 3

| Total time of high frequency irradiation (seconds) | 30 | 60 | 90 | 120 | 150 |
|---|---|---|---|---|---|
| Soybean milk (initially at 26° C.), ° C. | 41 | 55 | 65 | 75 | 85 |
| Soybean-curds (initially at 26° C.), ° C. | 29 | 39 | 49 | ¹58 | ¹65 |

¹ Outside boiled.

As is seen from the results shown in Table 3, there is a marked difference in the rate of temperature rise between soybean milk and soybean curds. For instance, in the case of soybean milk, 60-second irradiation suffices for heating it to 55° C., whereas the soybean-curds can be heated to 58° C. by the irradiation for as long as 120 seconds. It is further noted that water at the outside portion of soybean-curds begins to be boiled by the 120-second irradiation, but no boiling is observed in the soybean milk when it is subjected to the irradiation for 150 seconds. Soybean milk is considered to be a uniform solution, whereas soybean-curds, a mixture of water and a coagulation product of protein. Thus, while the soybean milk is substantially uniformly heated, the heating of soybean-curds is very non-uniform.

The coagulation product of protein is less capable of absorbing electric wave energy than water. Accordingly, when it is subjected to high frequency irradiation, the temperature rise in the protein coagulated product is slow. But water which readily absorbs electrical wave energy absorbs extra energy not absorbed by the protein coagulated product, and the temperature rise becomes so large as to bring about its boiling. At this stage, however, the temperature of the coagulation product is still about 50–60° C.

EXAMPLE

By the customary method, water-immersed soybean was ground, heated, and filtered. The filtrate was cooled to 25° C. to form soybean milk. Separately, 4.5 cc. of an aqueous solution of gluconodeltalactone having a concentration of about 20 w./v. percent were injected into a container made of high density polyethylene and having a size of 47 x 80 x 80 mm., the amount being 0.3 w./v. percent calculated as gluconodeltalactone based on the soybean milk. Into the container 300 ml. of the cooled soybean milk were poured. The opening of the container was sealed. The packaged soybean milk was subjected to high frequency irradiation for 100 seconds using electronic range NE-500 (high frequency output 500 w., frequency 2450 mHZ.), and then subjected to carryover heating for 5 minutes, followed by the high frequency irradiation for 50 seconds. The heated container was allowed to stand for 2 hours at 50° C. in a constant-temperature vessel, and then cooled to room temperature. The packaged soybean-curds so produced had no such defects as water release and roughening as compared with the conventional products, and were of good quality with fine texture. The preservability of the product of this Example was substantially the same as that of the product obtained by heating at 90° C. for 40 minutes.

What is claimed is:

1. In a process for the production of packaged soybean curds, which comprises cooling soybean milk obtained by filtration subsequent to immersing soybeans in water to be ground and heated, followed by packing the soybean milk into a packaging container and sealing the packaging container immediately after addition thereto of a coagulating agent, followed by coagulation and sterilization of the soybean milk, the improvement wherein said sterilization is carried out by irradiating said soybean milk with electric waves having a frequency within the range of 500–10,000 mc./sec. for a period of 50–200 seconds until a temperature of 55–85° C. is reached, and thereafter coagulation is effected by allowing the soybean milk to stand for a period of 20–40 minutes at a temperature of 40–80° C.

2. The process of claim 1 wherein said soybean milk is heated for 60–150 seconds by irradiating with said electric waves until the temperature reaches 60–80° C., and then said soybean milk is allowed to stand for 20–40 minutes at a temperature of 40–80° C.

3. The process of claim 1 wherein after said electric wave irradiation for 50–100 seconds, the irradiation is stopped for 1–5 minutes, and then the irradiation is again performed for 50–100 seconds.

4. The process of claim 1 wherein after said electric wave irradiation for 50–70 seconds, the irradiation is stopped for 3–5 minutes, and then the irradiation is again performed for 50–70 seconds.

5. The process of claim 1 wherein said electric waves have a frequency in the range of 2,450±50 mc./sec.

References Cited

UNITED STATES PATENTS

| 3,563,762 | 2/1971 | Kwee-Seong Lo | 99—98 X |
| 3,095,359 | 6/1963 | Heller | 21—51 R |
| 3,215,539 | 11/1965 | Landy | 21—51 R |
| 1,863,222 | 6/1932 | Hoermann | 21—51 R |

FOREIGN PATENTS

| 3,460 | 1965 | Japan. |
| 645,981 | 7/1962 | Canada. |

OTHER REFERENCES

Smith et al. "Tofu From Japanese and U.S. Soybeans" reprinted from Food Technology, vol. XIV, #7, p. 332–36 (1960).

Summer "High Frequency and Infra Red" Food Processing, Packaging, Marketing, vol. 22 pp. 4–7 (January 1953).

S. LEON BASHORE, Primary Examiner

A. D'ANDREA, JR., Assistant Examiner

U.S. Cl. X.R.

21—54 R; 99—98 221